United States Patent
Tarasco et al.

(10) Patent No.: US 10,124,366 B2
(45) Date of Patent: Nov. 13, 2018

(54) POWDER COATING (ELECTROSTATIC PAINTING) METHOD AND PLANT FOR NON ELECTRICALLY CONDUCTIVE ELEMENTS, AND IN PARTICULAR BRAKE PADS

(71) Applicant: ITT ITALIA S.r.l., Lainate (IT)

(72) Inventors: Pier Luigi Tarasco, Lainate (IT); Francesco Laureri, Lainate (IT)

(73) Assignee: ITT Italia S.r.l. (IT)

( * ) Notice: Subject to any disclaimer, the term of this patent is extended or adjusted under 35 U.S.C. 154(b) by 529 days.

(21) Appl. No.: 14/442,430

(22) PCT Filed: Nov. 13, 2013

(86) PCT No.: PCT/IB2013/060115
§ 371 (c)(1),
(2) Date: May 13, 2015

(87) PCT Pub. No.: WO2014/076647
PCT Pub. Date: May 22, 2014

(65) Prior Publication Data
US 2016/0038967 A1    Feb. 11, 2016

(30) Foreign Application Priority Data
Nov. 13, 2012 (IT) .............................. TO2012A0981

(51) Int. Cl.
*B05D 1/04* (2006.01)
*F16D 69/00* (2006.01)
(Continued)

(52) U.S. Cl.
CPC .............. *B05D 1/045* (2013.01); *B05B 5/001* (2013.01); *B05B 5/082* (2013.01); *B05D 1/06* (2013.01);
(Continued)

(58) Field of Classification Search
CPC ....... B05D 1/045; B05B 15/0425; B05B 5/14; B05B 5/084; B05B 13/0221
See application file for complete search history.

(56) References Cited

U.S. PATENT DOCUMENTS

| | | | |
|---|---|---|---|
| 5,622,785 A * | 4/1997 | Gaylor | F16D 65/0006 188/251 A |
| 2003/0143325 A1 * | 7/2003 | Nicholl | B05D 1/045 427/180 |

(Continued)

FOREIGN PATENT DOCUMENTS

| | | |
|---|---|---|
| EP | 1 227 262 A1 | 7/2002 |
| JP | 60-061078 A | 4/1985 |
| WO | WO 92/15404 A1 | 9/1992 |

OTHER PUBLICATIONS

International Search Report and Written Opinion for PCT/IB2013/060115; dated Feb. 3, 2014; 9 pages.

*Primary Examiner* — Alex A Rolland
(74) *Attorney, Agent, or Firm* — Barclay Damon, LLP

(57) ABSTRACT

A method and system for powder coating non electrically conductive elements, preferably brake pads. A pre-treatment station is upstream of an electrostatic powder coating deposition station and a baking station for melting and polymerizing the powder coating in order to form a coating layer on a surface to be coated. The pre-treatment station causes the elements to be coated to conduct electrically by uniformly wetting said elements by means of creating poorly mineralized water covalent bonds on at least one surface to be coated, in an amount aimed at producing a measurable weight increase in the non electrically conductive elements, which then causes them to conduct electrically. The water adsorbed and/or deposited is subsequently eliminated within the baking station.

4 Claims, 4 Drawing Sheets

(51) Int. Cl.
*B05B 5/00* (2006.01)
*B05B 5/08* (2006.01)
*B05D 1/06* (2006.01)
*B05D 3/02* (2006.01)

(52) U.S. Cl.
CPC ........... *B05D 3/0272* (2013.01); *F16D 69/00* (2013.01); *F16D 2250/0046* (2013.01)

(56) References Cited

U.S. PATENT DOCUMENTS

| | | | |
|---|---|---|---|
| 2004/0086658 A1* | 5/2004 | Onoyama | B05D 1/045 427/458 |
| 2008/0199681 A1* | 8/2008 | Murphy | C04B 35/6269 428/312.8 |
| 2009/0071107 A1* | 3/2009 | Ehrmann | B65B 53/02 53/442 |

* cited by examiner

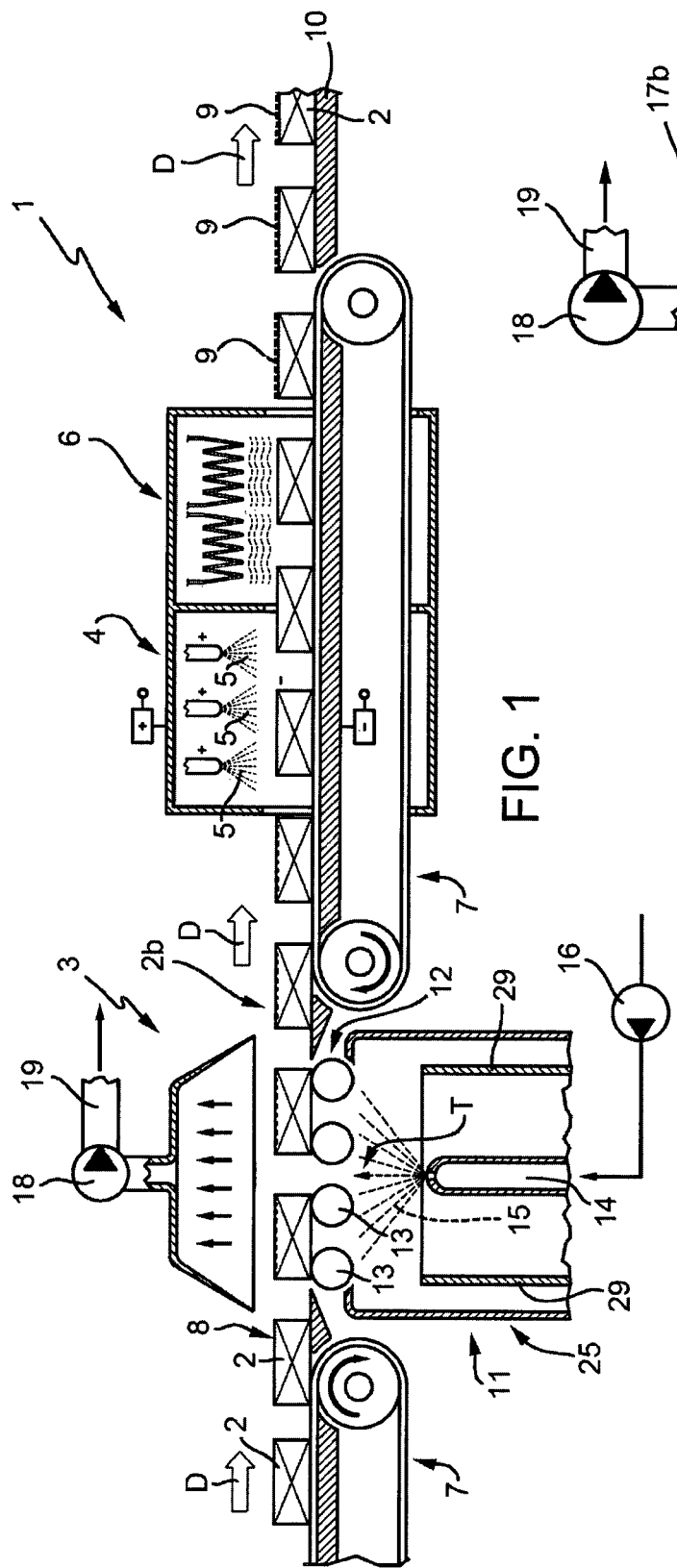
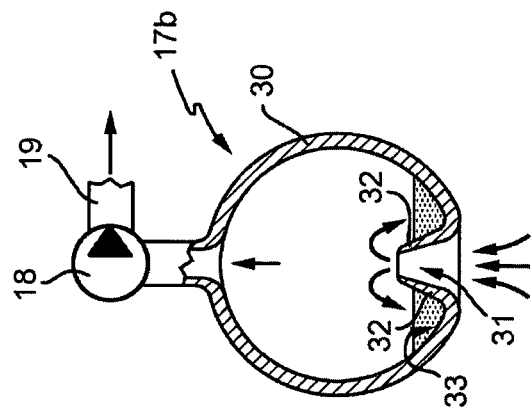
FIG. 1
FIG. 2

POWDER COATING (ELECTROSTATIC PAINTING) METHOD AND PLANT FOR NON ELECTRICALLY CONDUCTIVE ELEMENTS, AND IN PARTICULAR BRAKE PADS

CROSS-REFERENCE TO RELATED APPLICATIONS

This application is a national stage application under 35 U.S.C. § 371 of International Application No. PCT/IB2013/060115, filed Nov. 13, 2013, which claims priority of Italian Patent Application No. TO2012A000981, filed Nov. 13, 2012, the entire contents of each application being herein incorporated by reference.

TECHNICAL FIELD

The present invention relates to a method and process for powder coating non electrically conductive elements, and in particular brake pads made with NAO ("Non Asbestos Organic" i.e. asbestos-free organic friction) friction materials.

TECHNICAL BACKGROUND

Friction materials utilized as the lining in drum brake shoes of drum brakes and in the brake pads in automobile disk brakes and other devices (for example in clutch plates) are manufactured with a compound (mixture) comprising a fibrous or fiber material, an organic binder (usually a phenolic synthetic resin) and a bulk or "filler". Instead of asbestos as the fiber material, which has been legally banned as a substance dangerous to the environment, mixtures of other organic and inorganic materials are utilized, such as rock wool, aramid and carbon fibers, metal fibers or powder such as copper, tin, iron, aluminum, and other metals or metal alloys such as bronze or brass. EP1227262 for example, indicates the use of a friction material of the above described type containing approximately 10% copper fibers by volume, between 0.1 and 15% tin and/or tin sulfide by volume, and between 4 and 9% bronze fibers by volume.

NAO compounds, due to their composition, have an electric conductivity not sufficient to ensure a good painting thereof; things are even worse if the copper is eliminated (due to environment care compounds without copper are more and more requested).

Even though in brake pads the compound is manufactured as a plaque or pad assembled on a metal plate in order to form the actual brake pad, painting brake pads made with non electrically conductive materials presents numerous problems. In particular, it is presently impossible to utilize currently used powder coating plants built to coat/paint brake pads that are electrically conductive.

More generally it is also known that in order to powder coating (a painting technology requiring use of electrostatic charges) non electrically conductive elements such as for example mechanical components manufactured with plastic polymers, a conductive primer is applied to the surface of the non conductive element to be painted. However, conductive primers are based on organic solvents which are noxious and dangerous to the environment.

Attempts to powder coat brake pads made with non conductive compounds have not been successful up to now; this is because, when at all possible, (thanks to the presence of the metal base support for the plaque in a non conductive compound), the preparation, finish, and thickness are not satisfactory: brake pads manufactured using this method are therefore unable to pass standard corrosion tests.

The only alternative available therefore is the use of other coating technologies, which are however more expensive and require large specially devised plants that call for an unacceptable investment considering present manufacturing volumes.

BRIEF DESCRIPTION

The object of the present invention is to provide a powder coating method and process for non electrically conductive elements, and in particular NAO brake pads, which will lead to optimal application, coverage and surface finishing, comparable to that which can be achieved with plants that are currently in use and that have been designed for treating electrically conductive brake pads manufactured using metal containing compounds; all of this while utilizing presently existing plants with minimal modifications and without the use of conductive primers.

The invention therefore relates to a powder coating method for non electrically conductive elements, in particular brake pads. The invention further relates to a powder coating plant for treating non electrically conductive elements, in particular brake pads.

According to a main aspect of the invention, upstream of an electrostatically charged painting powder coating/deposition station and of a baking station used to melt and polymerize the coating powder in order to form a coating layer on the surface to be coated of the non conductive elements, a pre-treatment station is present in order to make the elements to be coated temporarily electrically conductive by uniformly wetting the same by adsorption and/or deposition of water, preferably poorly mineralized water, on at least the aforementioned surface to be coated with an amount that is sufficient to produce a measurable weight increase in the non conductive elements, which will then cause said elements to become electrically conductive. The adsorbed and/or deposited water is subsequently eliminated within the baking station.

Within the scope of the present invention, "poorly mineralized water" or "low mineral content water" shall be understood to be water which is devoid of ions which would be potentially chemically reactive with iron compounds and that has a dry residue and an electric conductivity which are quantitatively comparable to those of bottled water.

In particular, according to an aspect of the invention, the water to be utilized according to the method of the invention and the plant to implement thereof must possess a chemical composition devoid of ions which would be potentially chemically reactive with iron compounds and such that the water possesses a value of the specific electrical conductivity measured at 20° C. comprised between 1 and 5,000 µS/cm and preferably comprised between 10 and 700 µS/cm [in the Metric System "S" is the symbol for Siemens].

Furthermore, according to the applicant's technician's findings the water must be adsorbed and/or deposited on each non electrically conductive element to be made conductive in an amount that will cause a weight increase in each electrically non conductive element of between 0.15% and 0.30%.

In this manner the electric resistance of brake pads manufactured, with asbestos-free organic friction compounds changes from an order of magnitude of 1,000,000 MΩ (Mega Ohm) before pre-treatment, to values around 0.011 MΩ after pre-treatment, and then back to pre-treatment values at the end of the baking phase, which is commonly carried out in a tunnel oven. Hence pre-treated brake pads can be coated by means of traditional powder coating methods by depositing the coating powder electrostatically by means of the same steps already in use for brake pads manufactured with electrically conductive compounds.

According to additional aspects of the invention, the plant for implementing the method of the invention may be realized according to two separate embodiments.

In a first embodiment the pre-treatment station comprises a superheated steam generator operating with a low mineral content water, for instance well water; a plurality of delivery nozzles for a superheated steam towards the non electrically conductive elements; an air/steam mixing means suitable for producing an air/steam flow with an air steam ratio of between 15 and 30 m$^3$/kg aimed at the non electrically conductive elements, when the elements are located on a transport mechanism upstream of the electrostatic powder coating station; and cooling means where the non electrically conductive elements are driven by the transport mechanism downstream of the air/steam mixing means and immediately upstream of the electrostatic powder coating station.

In a second preferred embodiment, the pre-treatment station comprises a motorized roller rack for tidily conveying the non electrically conductive elements; a plurality of nozzles for delivery high pressure jets of low mineral content water towards the non electrically conductive elements, said nozzles being suitable for creating a mist all around the non electrically conductive elements; at least one supply pump for the nozzles; and an extraction hood facing the nozzles.

According to this embodiment, the entire pre-treatment station laid out along its longitudinal axis, that is to say in the direction of advancement of the brake pads to be coated, occupies overall a section of only 45 mm (equal to the length of the motorized roller rack), implements the pre-treatment stage in only 10 seconds, and with negligible power consumption (about 1 KW).

In particular these results are obtained by means of two constructive features: on one hand the nozzles are aligned in line to one another underneath the motorized roller rack, so that their jets are aimed from below upwards at a predetermined vertical distance from the motorized roller rack, leaving an empty space, possibly adjustable, between the rack and the nozzles; and on the other hand the extraction hood is defined by a tubular element provided with a straight collection slit facing the nozzles in the same direction of alignment as the nozzles themselves. As a matter of fact, it has been found that when these two constructive features are present at the same time, they have a synergistic effect that permits regulation of the amount of poorly mineralized water deposited on the brake pad and that wets the compound to be treated with an extremely high degree of precision. This is of the essence in order to achieve the desired electrical conductivity without soaking too much the brake pads.

An additional advantage of the system according to the invention is that it is capable of coating both, NAO asbestos-free organic brake pads and low steel metallic brake pads by simply turning off the pre-treatment station. It is therefore possible to alternate from one type of compound to the other on the same production line without performing any modifications.

Finally, the plant and method of the invention are completely environmentally friendly.

BRIEF DESCRIPTION OF THE DRAWINGS

Additional features and advantages of the present invention will be apparent from the following description of the two non limiting embodiments thereof given exclusively for exemplification purposes with respect to the enclosed drawings, where:

FIG. 1 depicts a schematic lateral elevation view, partially in a longitudinal cross-section, of a powder coating plant implemented according to the invention;

FIG. 2 depicts an enlarged scale schematic view in cross-section of a component in the plant in FIG. 1;

DETAILED DESCRIPTION

Figure 3:
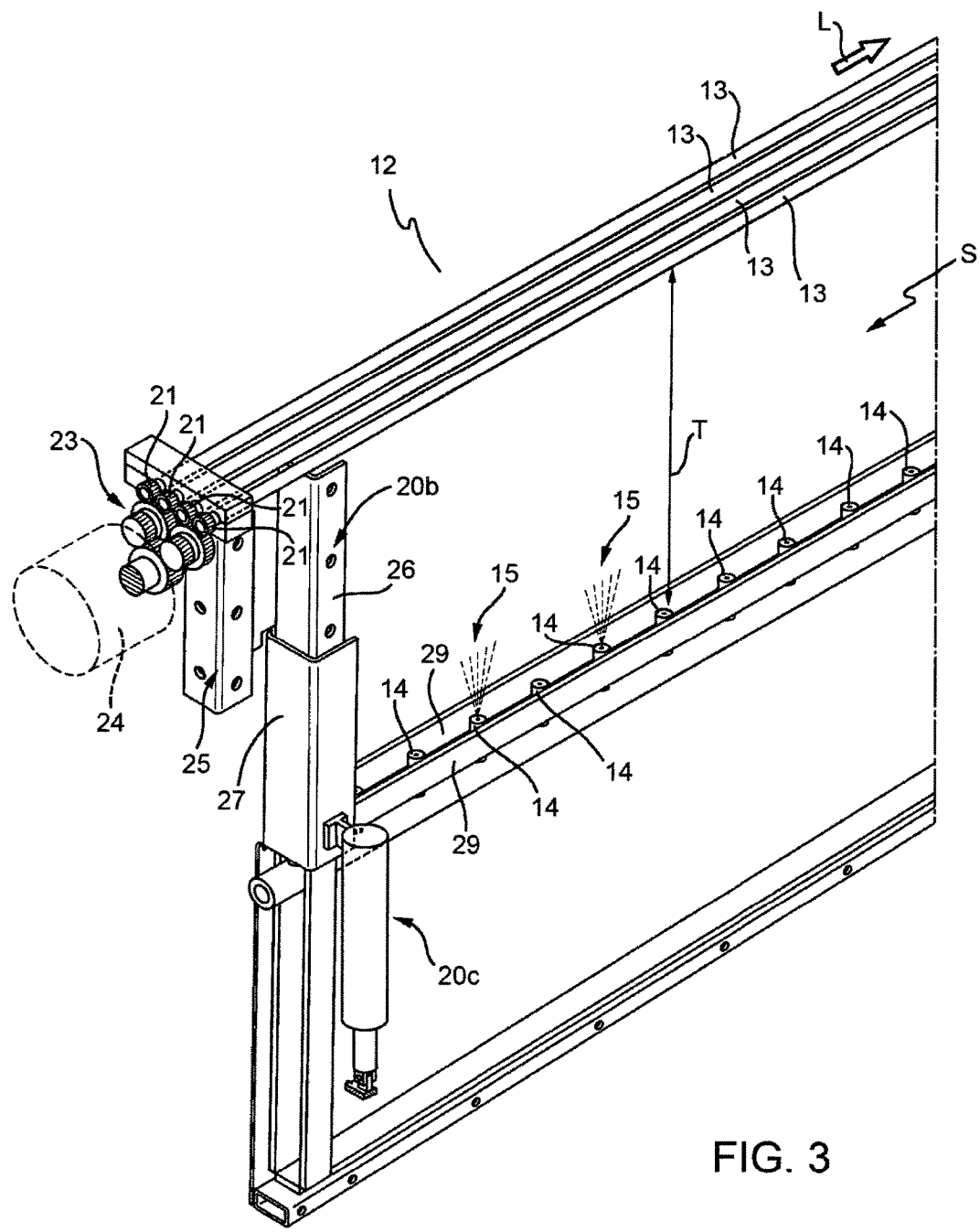
FIG. 3 depicts an enlarged scale perspective view of a second component of the plant in FIG. 1.

With reference to FIG. 1, is depicted a powder coating plant, overall indicated with reference number 1, for painting non electrically conductive elements 2, in particular brake pads manufactured with asbestos-free organic friction compounds, known in the art and therefore not shown in detail but only illustrated as blocks.

Said type of brake pads are initially manufactured by molding the compound at a temperature of between 130 and 200° C. in order to create a plaque or pad, which are subsequently cured by thermal treatment, assembled onto an iron metal support, and finally painted together with the support.

NAO brake pad compounds obtained in this manner however, using previously existing technologies, cannot be powder coated but only spray painted, with all the associated issues, including protection of the environment, that this implies.

According to the invention, on the contrary, the powder coating plant 1 is utilized, which in general comprises a pre-treatment station 3, where non electrically conductive elements 2 are made to be temporarily electrically conductive in the manner that will be described hereinafter and are therefore "transformed" into electrically conductive elements 2b, a station 4, of a type known in the art and therefore illustrated only schematically, where coating powders 5 are applied electrostatically onto elements 2b, a melting and polymerization station 6 for the coating powders 5, preferably defined by a baking oven of the tunnel type known in the art and therefore illustrated only schematically for simplicity, and at least one transport mechanism 7 suitable for tidily transporting non electrically conductive elements 2 to be coated in series along stations 3, 4, and 6, in order to traverse the same and finally produce non electrically conductive elements 2 provided with at least one surface 8 to be coated (which may extend to the entire external surface of elements 2 or to part only thereof as the case may be), a coating layer 9 made of the coating powders 5 melted and polymerized in oven 6 at the temperature common for powder coating processes (in general around 200-220° C.).

In the depicted non limiting example, plant 1 comprises a transport device 7 traversing stations 4 and 6, and which places the coated elements 2 onto a table 10, and a second device 7 supplying elements 2 to station 3, located upstream of stations 4 and 6.

Hereinafter the terms "upstream" and "downstream" are understood as referring to the direction of advancement D of non electrically conductive elements 2 along plant 1, and more specifically stations 3, 4, and 6, indicated by the arrows in FIG. 1.

According to the invention, pre-treatment station 3 comprises a means 11 for depositing and/or adsorbing poorly mineralized water onto at least the surface 8 to be coated of the non electrically conductive elements 2, and preferably on each entire non electrically conductive element 2, in order to cause a measurable weight increase in the non electrically conductive elements 2, corresponding to an amount of low mineral content water retained on the same (at least in correspondence with the surface 8) thus causing said elements 2 to temporarily electrically conduct, "transforming them" into elements 2b.

As previously stated, "poorly mineralized water" is to be understood as water having a composition devoid of ions that would be potentially chemically reactive with iron compounds (which constitute the support for the asbestos-free organic friction compound of brake pads 2), and hence devoid of ions such as $Cl^-$, and having an amount of dry residue and an electric conductivity quantitatively comparable to those of the bottled water. The poorly mineralized water that may be used in plant 1 according to the invention must nonetheless possess a chemical composition such that it has a specific conductivity measured at 20° C. comprised between 1 and 5,000 μS/cm and preferably between 10 and 700 μS/cm.

Furthermore, still according to the invention, melting and polymerization station 6 for coating powders 5 must be suitable not only for melting and polymerizing powders 5, but also for eliminating at least part (in fact substantially all) of the water previously adsorbed and or deposited onto non electrically conductive elements 2. Taking into account that station 6 comprises a tunnel oven known within the art where temperatures in the range of 200° C. are reached, this last characteristic is built-in. Nonetheless, said characteristic is necessary within the scope of the invention, and hence precludes the use of melting and polymerization stations where there is no certainty of eliminating the water retained upon/within the elements 2.

According to the embodiment illustrated in FIG. 1, pre-treatment station 3 of plant 1 comprises in combination: a rack 12 comprising a plurality of, for example four, motorized rollers 13 displaced each from the other in direction D along which the non electrically conductive elements 2 are transported tidily in line during processing; a plurality of nozzles 14 supplying high pressure jets 15 of poorly mineralized water (as previously defined, for example well water) towards the non electrically conductive elements 2 found on the rack 12; at least one pump 16 supplying (at a pressure greater than 60 bar and preferably equal to 70 bar) the low mineral content water (contained in a tank not illustrated for simplicity or obtained directly from a well or other natural sources) to nozzles 14; and an extraction hood 17 facing the supply nozzles 14 and provided with a suction fan 18 that collect the environment air together with most of the water supplied by the nozzles 14, so as to prevent water dripping onto the elements 2 after the jets 15 have passed through the rack 12 (through the spacing between the rollers 13) and "wetting" the elements 2 found on the rollers 13.

In particular, the nozzles 14 supply jets 15 that expand in a cone pattern dispersing the water in the air thanks to the drop in pressure at the nozzle, creating in the process a mist (a very fine uniform dispersion of water micro droplets in air) all around the non electrically conductive elements 2 traversing on rollers 13, around the rollers 13 themselves, and in general around the entire volume between the nozzles 14 and hood 17, which wets and deposits a conductive film onto the insulating surface of the elements 2, and where excess water is subsequently aspirated by the hood 17 by means of the suction fan 18, which forces the water into a discharge pipe 19. Being a simple mixture of water and air, the mist aspirated by the hood 17 may be discharged directly into the environment, or treated in order to at least partially recycle the water.

According to the illustrated preferred embodiment, the supply nozzles 14 (see FIG. 3) are aligned and spaced along the direction L (FIG. 3), perpendicular to the transport direction D of the non electrically conductive elements 2 along the plant 1 in general, and on the motorized rollers 13 rack 12 in particular. Direction L is specifically perpendicular to direction D.

In the illustrated example, nozzles 14 are placed under the motorized rollers 13 of rack 12, in order to aim the jets 15 from below upwards; moreover, according to an important aspect of the invention, the nozzles 14 are spaced apart vertically from the motorized rollers 13 of rack 12 by a fixed amount i.e. a predetermined distance T, so that between the rack 12 of motorized rollers 13 and the nozzles 14 there is an empty space, indicated by the letter S in FIG. 3.

Preferably, station 3 in plant 1 also comprises a means 20 for varying in an adjustable manner the predetermined distance T, which is illustrated schematically only in FIG. 3 as holes 20b and as a hydraulic or pneumatic piston 20c (any other type of actuator is suitable). According to the non limiting illustration in FIG. 3, the rollers 13 are each attached to a gear 21, which is rotated by means of a gear transmission 23 driven by a motor 24 common to all four rollers 13, which therefore rotate synchronously. Rollers 13, transmission 23, and motor 24, together with all the remaining rack 12 parts are supported by a frame 25 which is part of the support structure of the plant 1, not illustrated for sake of simplicity.

Frame 25 also comprises upright supports 26 eventually provided with holes 20b spaced apart to one another in the vertical direction; for example, on the upright supports 26 (only one of which is shown for simplicity in FIG. 3, however it is clear that at least two are necessary, one on each side of rack 12) slides a C section beam 27. The beam 27 provides support for a pipe 28 laid out along direction L, which further bears upwards the nozzles 14. The nozzles 14 are arranged in a line within a pair of bulkheads 29 also connected to beam 27, the top border of which defines the distance T of the nozzles 14 from the rollers 13. Beam 27 may be activated automatically by actuation means 20c, or displaced manually while system 1 is not operating, and fixed in a new position by inserting specially devised fixing pins or cleats (known in the art and not illustrated for simplicity) into holes 20b.

While possessing the above described characteristics, extraction hood 17 is not only constructed as illustrated schematically in FIG. 1, but is instead implemented as an extraction hood 17b depicted in FIG. 2.

Extraction hood 17b is defined by a tubular element 30 facing nozzles 14 below, provided with a straight longitudinal aspiration slit 31 running along the direction L of nozzles 14. Said straight slit 31 is defined along its length by two V bent edges/rims 32 bending back into tubular element 30 so as to define inside and at the bottom of said tubular element a water collection suction trap, from which suction trap 33 the collected water (which is thus prevented from falling back towards elements 2) is then removed by the suction fan 18 by means of suction. For this purpose, suction fan 18 is arranged to face directly opposite slit 31.

In this manner, the mist created by nozzles 14, thanks to the empty space S between them and rollers 13, in which jets 15 can be dispersed precisely forming the cited mist, is extracted by hood 17b through slit 31, causing it to travel around elements 2 and rack 12. Subsequently, the water droplets suspended in the air in order to form said mist, are extracted by hood 17b together with the air where they are suspended; a large portion of the water finds its way directly into drain 19; the water droplets that are not directed to drain 19 lose velocity within pipe 30, which operates as a form of cyclone, and are collected into suction trap 33, without falling onto elements 2, also thanks to the presence of the bent edges 32.

Therefore, elements 2 being transported upon rack 12 receive a controlled amount of water, which they are able to covalently retain, consequently slightly increasing their weight. System 1, and in particular the elements comprising station 3, is/are sized to cause an increase in weight of elements 2 traversing station 3 of between 0.15% and 0.30%.

Figure 4:
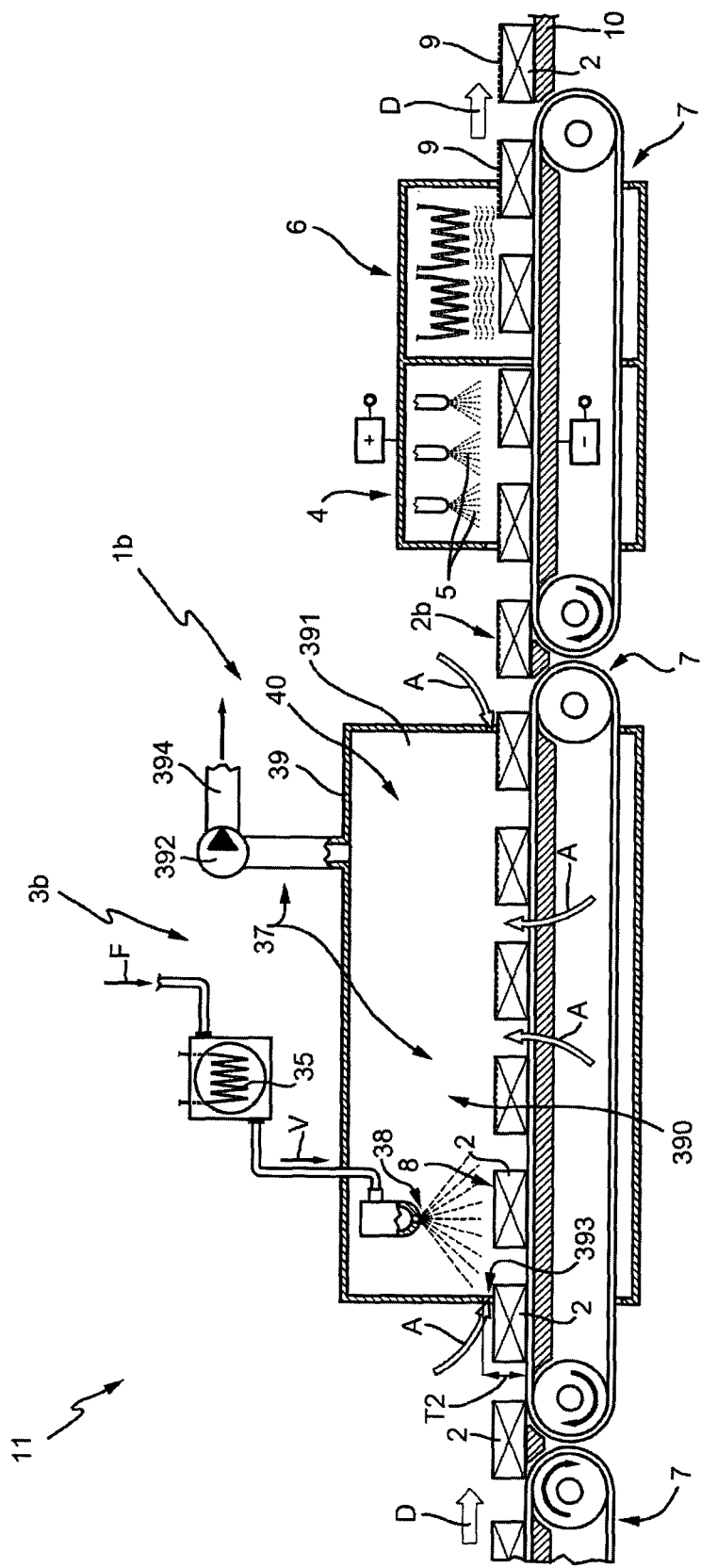
FIG. 4 depicts a schematic lateral elevation view, partially in a longitudinal cross-section, of a second embodiment of the powder coating plant implemented according to the invention.

With respect to FIG. 4, where similar or identical details to those described previously are indicated with the same reference numbers for simplicity, a plant 1b is depicted corresponding to a possible variation of plant 1 according to the invention, previously described.

Plant 1b differs from plant 1 in that pre-treatment station 3 is replaced by a pre-treatment station 3b again for the purpose of uniformly wetting in a controlled manner at least the surface 8 to be coated, and preferably each entire non electrically conductive element 2 by adsorption and/or deposition of poorly mineralized water which is covalently retained on elements 2, but in a different manner.

Pre-treatment station 3b comprises: a superheated steam generator 35 that receives a flow of low mineral content water F, as defined previously, and heats it in order to create a flow of steam V at approximately 200° C.; a plurality of nozzles 38 supplying such steam to non electrically conductive elements 2; and steam/air mixing means 37 suitable for creating a flow of air/steam with a steam ratio of between 15 and 30 m$^3$/kg directed towards non electrically conductive elements 2, when these are located on transport device 7.

According to the non limiting example shown, plant 1b comprises three separate transport devices 7, a first device to load elements 2 into station 3b, a second device 7 included as an integral component of station 3b, on which elements 2 are found when struck by the air/steam flow, and a third device 7 traversing stations 4 and 6 to deposit the coated elements 2 onto table 10. Nozzles 38 (as is the case for all of station 3b) are obviously located upstream of electrostatic application station 4 of coating powders 5, and are arranged in an analogous scheme to that of nozzles 14, but positioned so as to operate above elements 2 and above transport mechanism 7 on which elements 2 are placed tidily e.g. in series while traversing station 3b.

Station 3b further comprises a cooling means 40 for elements 2b located immediately upstream of powder coating station 4. Elements 2b are simply the non conductive elements 2 that retain the poorly mineralized water supplied by said controlled air/steam flow and which therefore form a covalent bond (also for system 1 described previously) directly above elements 2, which thus become electrically conductive elements 2b.

In the depicted non limiting embodiment, air/steam mixing means 37 and cooling means 40 are defined by two adjacent sections 390 and 391 of a tunnel hood 39 arranged above transport mechanism 7 comprised in station 3b at a predetermined distance T2 from transport mechanism 7 and from a suction fan/aspirator 392 assembled on tunnel hood 39 which aspirates air from the environment into tunnel hood 39 through a slit or gap 393 defined by the distance or empty space T2 between the top surface of transport mechanism 7 on which elements 2/2b are placed and the bottom border of tunnel hood 39; said air, together with a large portion of the steam supplied by nozzles 38, which are arranged inside tunnel hood 39 within section 390 distal from coating station 4, is eliminated by means of a drain 394. Section 391 of tunnel hood 39 is instead next to station 4 and is found immediately downstream of nozzles 38 and immediately upstream of electrostatic powder coating 5 application station 4.

Within section 390 the steam V supplied by nozzles 38 is mixed with part of the environmental air aspirated through gap 393 within hood 39, where the flow of air/steam formed in this manner is directed towards fan 392 and hits elements 2, depositing an amount of poorly mineralized water onto the same, which adheres to surface 8 by means of covalent bonds, "transforming" non conductive elements 2 into conductive elements 2b. In section 391, the remaining environmental air aspirated into tunnel hood 39 by fan 392 hits electrically conductive elements 2b, thus eliminating potential excess water and cooling them (elements 2/2b are in fact heated in section 390 as a result of the heat content of steam V to a temperature not suitable for carrying out the electrostatic powder coating 5 deposition).

On the basis of the above description, it is clear that both plants 1 and 1b are suitable for implementing a method for powder coating of electrically non conductive elements 2, in particular brake pads, comprising: a pre-treatment phase, where non electrically conductive elements 2 are made to electrically conduct on at least one of a surface 8 thereof to be coated, giving rise to temporarily conductive elements 2b; a deposition phase where coating/painting powder 5 is applied by means of an electrostatic field to surface 8 to be coated; and a baking phase, where coating powder 5 previously applied on elements 2b is melted and polymerized in order to create a coating layer 9 on surface 8 to be coated.

According to the invention, instead of performing the deposition by spraying using solvents and a conductive primer as in the prior art, the pre-treatment phase consists in uniformly wetting at least surface 8 to be coated, and preferably each entire non electrically conductive element 2, by adsorption and/or deposition of water, preferably poorly mineralized water, as defined previously, in order to produce a measurable weight increase in the non electrically conductive elements 2, which causes said elements 2 to temporarily conduct electrically, giving rise to elements 2b.

The water retained by the non electrically conductive elements 2 in order to create elements 2b, which differ from elements 2 precisely because of the presence of water, preferably low mineral content water, adhered by means of covalent bonds to at least surface 8, is subsequently at least partially eliminated (preferably substantially completely removed) during the baking phase.

The poorly mineralized water retained by elements 2 by means of covalent bonds during the pre-treatment phase must possess a chemical composition such that the specific conductivity of such water measured at 20° C. is to be comprised between 1 and 5,000 µS/CM and preferably between 10 and 700 µS/cm. Furthermore, the pre-treatment phase is carried out so that each non electrically conductive element 2 retains such an amount of water (adsorbed and/or deposited) as to cause an increase in weight in each non electrically conductive element 2 of between 0.15% and 030%.

By means of plant 1b, the pre-treatment phase is performed producing, starting from said poorly mineralized water, superheated steam at least 200° C., mixing a flow V of said superheated steam with at least a proportion of an air flow A aspirated inside tunnel hood 39 from the exterior in order to generate at nozzles 38 housed in section 390 of tunnel hood 39 a flow of air/steam in a ratio of between 15 and 30 m³/kg, and directing said steam/air flow by means of suction fan 392 located in section 391 of tunnel hood 39, and therefore placed next to coating station 4 downstream of nozzles 38, onto the non electrically conductive elements 2, arranged tidily, e.g. in line on a conveyor belt (mechanism 7). Said pre-treatment phase is immediately followed by a cooling phase of non electrically conductive elements 2 and made electrically conductive (elements 2b) because of the poorly mineralized water retained with covalent bonds. Said cooling phase is carried out before depositing the painting powder 5, in section 391 of the tunnel hood 39, arranged downstream of section 390 where the nozzles 38 are located.

On the other hand, by means of plant 1 the pre-treatment phase is carried out by spraying high pressure poorly mineralized water jets 15 onto the non electrically conductive elements 2 in order to create a mist around said elements, while extracting the mist through extraction hood 17/17b.

In this case, jets 15 of said poorly mineralized water are aimed at non electrically conductive elements 2 from below, while the elements 2 are moving on the motorized roller rack 12, above which the extraction hood 17 is located.

The effects of the pre-treatment method according to the invention were tested experimentally on a set of samples. A plurality of brake pads of a type known in the art were produced, utilizing however asbestos-free organic friction compound.

Figure 5:
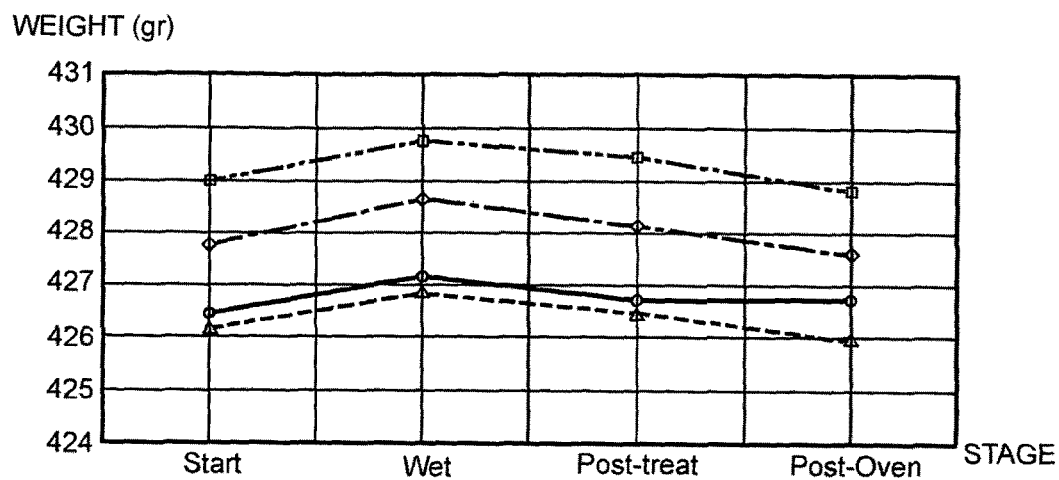
FIGS. 5 and 6 depict two charts displaying the weight and electrical conductivity variation of asbestos-free organic friction compound brake pads treated according to the method of the invention.

Some of the brake pads were treated by means of the above described station 3b with the steam/air mixture and subsequent cooling, measuring their weight before the treatment, after coming into contact with the air/steam mixture (wet pads) in section 390 of tunnel hood 39, after cooling in section 391 of tunnel hood 39, and after baking in tunnel oven 6, at the same temperature utilized for traditionally painted pads. The results obtained with the samples are displayed in FIG. 5. As it can be immediately seen, the charts depicting the change in weight of the various samples are completely consistent as a trend, and display an increase in weight for wet pads, which diminishes after the cooling phase, and which substantially disappears at the end of the baking phase, proving that the water retained by the brake pads after supplying the steam/air mixture is eliminated in the powder coated (painted) pads. Similarly, the continuous line chart displays the weight variation trend for a coated pad: as it can be seen, the weight of the pad after cooling remains constant, since the weight of the water lost is equivalent to the weight of the coating (coating powder 5) deposited and baked in stations 4 and 6.

Further brake pads were treated in station 3 described previously, displaying the same weight variation trend.

Figure 6:
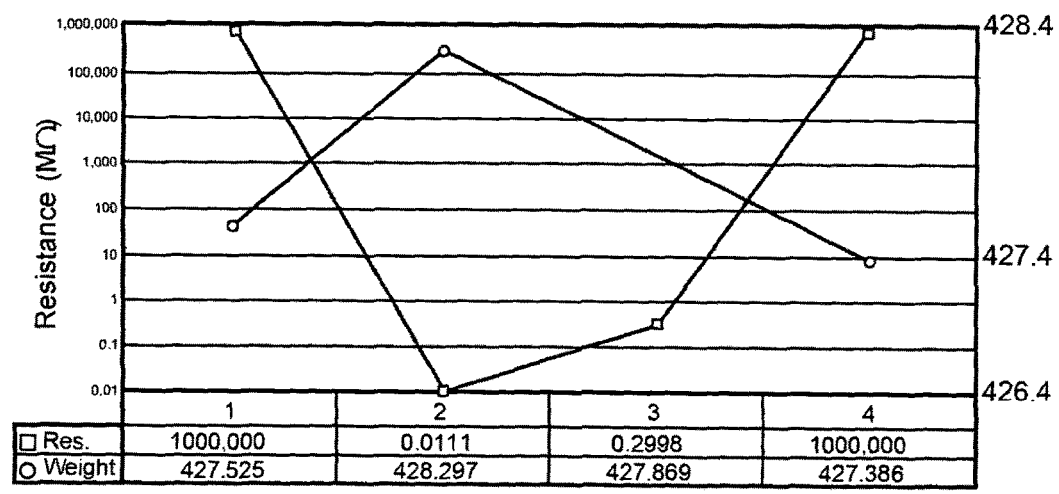

Finally the mean of the weight increase/decrease measurements and electrical resistance for the "blank" (not coated) brake pads before water treatment, after treatment, at the exit of tunnel hood 39, and at the exit of oven 6 are shown. The results obtained are shown in the charts in FIG. 6. As it can be seen, in the "wet" state the non conductive brake pads become conductive, showing mean electrical resistance values between 0.01 and 0.02 Mega Ohm, against a mean electrical resistance values of non treated pads (not wet) and after baking in oven 6 of approximately 1,000,000 Mega Ohm.

Since stations 4 and 6 are identical to those of traditional powder coating plants devised for treating brake pads obtained with conductive compounds (containing metal), it is clear that plants 1 and 1b can be derived from already existing plants, by simply adding station 3/3b in series. Furthermore, by simply activating/deactivating stations 3 and 3b, plants 1 and 1b are suitable for treating brake pads obtained from both conductive compounds, and non conductive compounds.

Therefore the aims of the invention are fully met.

The invention claimed is:

1. A method for powder coating of brake pads made with electrically non conductive materials, the brake pads including a metallic back plate upon which a block of a non-conductive friction material is secured and in which the back plate is at least partially made from iron or an iron compound, said method comprising:
   pre-treating the brake pads to make the non conductive friction material conductive on at least one surface thereof to be painted;
   electrostatically depositing a painting powder on the surface to be painted; and
   baking, in which the painting powder is melted and polymerized to form a coating layer on the surface to be painted, wherein the pre-treating step uniformly dampens at least the at least one surface to be painted and, each entire brake pad, by covalent retention of water, to such an extent to produce a measurable increase of weight of the electrically non conductive brake pads, such as to make such brake pads electrically conductive; the water retained on the electrically non conductive brake pads being subsequently eliminated at least in part during the baking step, wherein the pre-treating step is carried out with only low mineral content water devoid of ions that would chemically react with iron or iron compounds and having a specific conductivity comprised between 1 and 5,000 μS/cm measured at 20° C., and by spraying high pressure jets of said low mineral content water onto the electrically non conductive brake pads so as to create a mist all around the brake pads and at the same time aspirating said mist by means of a suction hood wherein the pretreating step renders the non-conductive friction material conductive, but without chemically reacting with the back plate of the brake pad so as to create oxidation during the baking step.

2. A method according to claim 1, wherein during the pre-treating step the amount of low mineral content water is sprayed by the high pressure jets to be retained on each electrically non conductive element such as to produce an increase of weight of each electrically non conductive element between 0.15% and 0.30%.

3. A method according to claim 1, wherein the high pressure jets of the low mineral content water are addressed onto the electrically non conductive elements from the bottom upwards while the elements move on a rack having powered rolls, over which said suction hood is arranged and in which an empty space is provided between the nozzles producing the high pressure jets of low mineral content water and the powered rolls of the rack.

4. The method according to claim 1, wherein the non-conductive friction material block of the brake pads is made from a non-asbestos organic material.

* * * * *